March 3, 1942.  H. REISSNER ET AL  2,275,053
VARIABLE PITCH PROPELLER FOR AIRCRAFT
Filed July 9, 1938  2 Sheets-Sheet 1
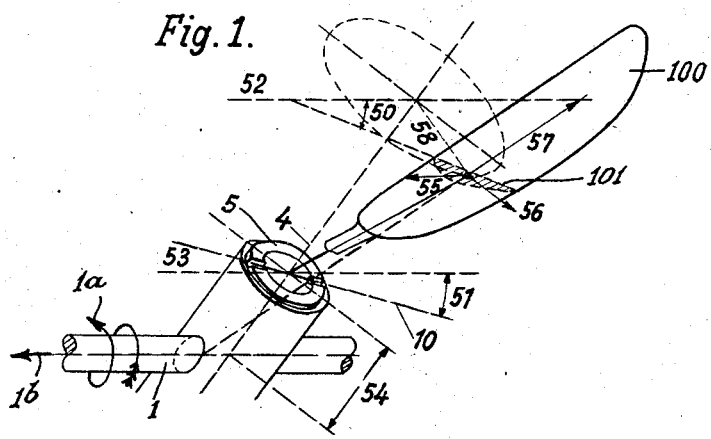
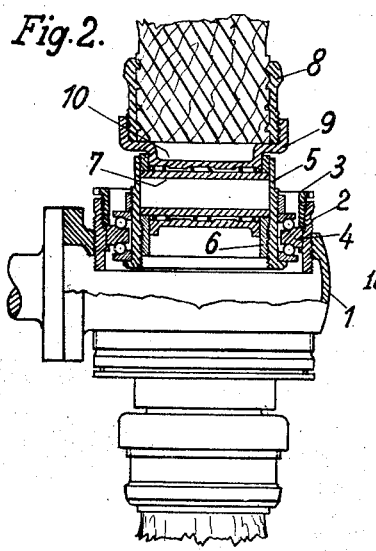
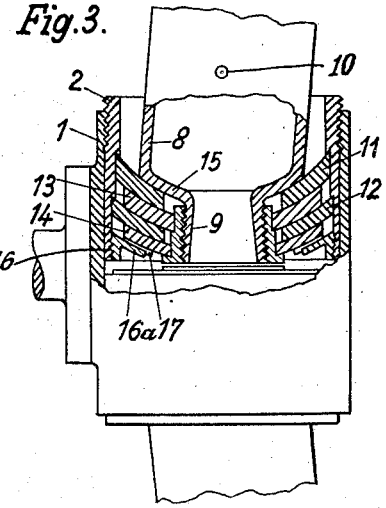
INVENTORS
Hans Reissner
Manfred Christian
By Otto Munk
their ATTY.

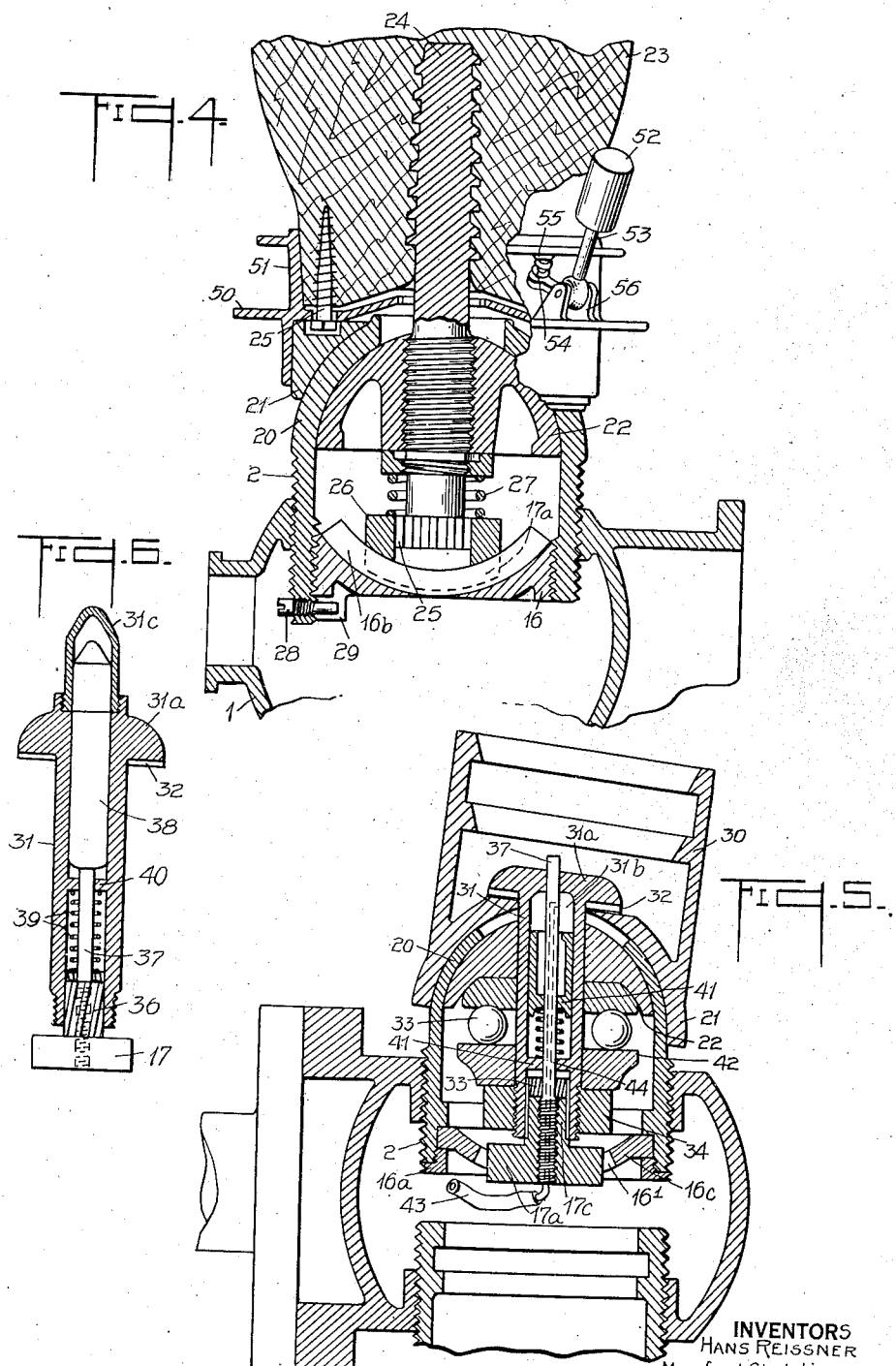

Patented Mar. 3, 1942

2,275,053

UNITED STATES PATENT OFFICE 2,275,053

VARIABLE PITCH PROPELLER FOR AIRCRAFT

Hans Reissner, Berlin-Charlottenburg, and Manfred Christian, Berlin-Reinickendorf, Germany Application July 9, 1938, Serial No. 218,276
In Germany August 27, 1936

15 Claims. (Cl. 170—164)

This invention relates to variable pitch propellers for aircraft.

One object of the invention is to provide a variable pitch propeller in which the blades are mounted on the propeller hub for rotary and tilting movements relative thereto in such a manner that each blade is automatically adjusted, for at least two conditions of flight, to an optimum pitch adjustment under the influence of the aerodynamic and centrifugal forces acting on the blades.

Another object of the invention is to construct a variable pitch propeller with rotatable and tiltable blades which are adjusted automatically to their optimum pitch positions without any danger of jamming or jerking, the blade roots, in all positions of the blades, being practically free of bending stresses.

A specific object of the invention is to devise a variable pitch propeller in which an increase of the air thrust adjusts the blades automatically to a reduced pitch while an increase in engine torque causes an automatic adjustment of the blades to an increased pitch.

Another specific object of the invention is to produce a variable pitch propeller in which the propeller blades assume automatically an infinitely large pitch whenever, during flight, the transmission of the torque from the engine to the propeller is interrupted, whereby the air resistance acting on the blades will not produce any torque on the propeller shaft, but the blades are automatically readjusted to a smaller pitch as soon as positive torque is transmitted again from the engine to the propeller. A further object of the invention is to provide a variable pitch propeller having rotatable blades capable of being automatically adjusted to their optimum pitch positions under the influence of the aerodynamic and centrifugal forces acting on the blades and means to counteract the pitch decreasing tendency of the centrifugal couple which acts on each blade during the rotation of the propeller.

A still further object of the invention is to construct a variable pitch propeller having blades arranged for automatic pitch adjustment under the influence of the aerodynamic and centrifugal forces acting on the blades and a pilot controlled mechanism for modifying the reaction of the blade to said forces so as to vary the condition of equilibrium and, with it, indirectly, the pitch of the blades at will.

Still another object of the invention is to combine, in a variable pitch propeller, rotatable and tiltable blades capable of being automatically adjusted, under predetermined conditions of flight, to optimum pitch positions under the influence of the aerodynamic and centrifugal forces acting on the blades, with automatic means to modify, outside of said predetermined flight conditions, the effect of said aerodynamic and centrifugal forces on the pitch adjustment of the blades.

The above mentioned and various other objects, which will appear more clearly as the specification proceeds, are accomplished, according to the present invention, by the arrangement and combination of elements set forth in the following detailed description, defined in the appended claims and illustratively exemplified in the accompanying drawings in which—

Fig. 1 is a diagrammatic perspective part view of a variable pitch propeller according to the invention.

Fig. 2 is a side elevation, partly in section of a propeller hub with bearings for a propeller blade according to one embodiment of the invention.

Fig. 3 is a similar elevation partly in section of a second embodiment including a part spherical bearing element.

Fig. 4 is a partial section of a propeller according to the invention including means to counteract the pitch decreasing tendency of the centrifugal couple which acts on the blades.

Fig. 5 is a similar section of still another embodiment of the invention including pilot controlled means for modifying the automatic pitch adjustment, and Fig. 6 is a sectional view of a modified detail which serves as an automatic device for varying the automatic pitch adjustment under certain circumstances.

Throughout the figures, equivalent parts are denoted by the same reference numerals. The propeller axis and the radial and transverse axes of Fig. 1 are, for the sake of convenience, identified with the propeller hub and the corresponding bearing elements, respectively, in Fig. 2.

Referring now to the drawings, and first to Fig. 1, I denotes the axis of a propeller shaft revolving in the direction indicated by the arrow Ia. A bearing 5 is mounted on the hub of the propeller shaft for rotary movements about an axis 4 fixed with respect to and radial of the propeller axis I, said bearing 5 being rotatable in a plane at right angles to the radial axis 4. The propeller blade 100 is secured to the bearing 5 tiltably about only one transverse axis 10 extending at substantially right angles to the centroid line of the blade 100, said transverse tilting axis 10 being fixed with respect to the bearing 5 and extending in the plane of rotation of the latter at a predetermined distance 54 from the propeller axis 1. 51 designates the variable angle between the transverse axis 10 and an imaginary line 53 extending parallel to the propeller axis 1.

The face of the blade, as represented by the chord 101 of any selected blade section, is disposed at a predetermined angle with respect to the transverse tilting axis 10. 50 denotes the variable angle between the representative chord-line 101 and an imaginary line 52 extending parallel to the propeller axis, and the predetermined angle between the transverse tilting axis 10 and the chord line 101 may be conveniently defined as the constant difference between the two variable angles 50 and 51.

The device operates as follows: When the propeller rotates to move the air craft in the direction of the arrow 1b, the centrifugal force 57 tends to bring the blade 100 into a position in which the centroid line of the blade coincides substantially with the radial axis 4. Simultaneously the torque resisting force 56 tends to tilt the blade 100 backwardly in the direction of propeller rotation about the transverse tilting axis 10. This tilting movement affords the forwardly acting air thrust 55 a leverage 58 about the radial axis 4, whereby the blade 100, under the action of the increasing air thrust, causes a rotary movement of the bearing 5 and of the transverse tilting axis 10 about the radial axis 4 until an equilibrium between the centrifugal force 57, the torque resisting force 56 and the air thrust 56 has been attained. During this rotary movement the angles 51 and 50 increase and the blade is adjusted to a correspondingly smaller pitch angle. If, on the other hand, the torque transmitted from the engine to the propeller increases, the tendency of the blade to assume a more inclined position in the plane of its rotation causes a rotary movement of the bearing 5 in the opposite direction and a corresponding increase in the pitch of the blade until the resulting increase in forward thrust, which tends to rotate the blade in the direction of pitch decrease, leads to the establishment of a new equilibrium. The amount of adjustment obtained in this manner depends, on the one hand, upon the distance 54 between the propeller axis 1 and the transverse tilting axis 10 and upon the predetermined angle between said transverse tilting axis 10 and the blade face, as represented by the chord line 101, and, on the other hand, on the magnitude of the air thrust 55 in relation to centrifugal force 57 and torque resistance 56.

The angular position of the transverse tilting axis 10 relative to the blade face and the distance of this axis 10 from the propeller axis 1 which for any given condition of flight and any given fuel supply will produce the most advantageous blade pitch and propeller speed, can be predetermined by calculation, and the relationship between transverse tilting axis 10, blade face and propeller axis 1 can be permanently set to the proper values.

Thus, the distance between the propeller axis and the transverse tilting axis and the angle between the latter and the blade face may be set to produce a certain predetermined value of blade pitch and propeller speed upon starting of the aeroplane and another predetermined value of blade pitch and propeller speed at top air speed of the aeroplane, whereby all intermediate blade pitch positions and propeller speeds will be functions of said two predetermined values.

It should be noted that in the construction described, the blade root, in all positions of the blade, is practically free of bending stresses, and the automatic pitch adjustment of the blade is effected without any danger of jamming or jerking.

In the practical embodiment of the invention, illustrated in Fig. 2, 1 denotes the propeller hub. A blade socket 2 is screwed into the hub 1 and carries an annular bearing element 4 secured in position by a lock nut 3. A cylindrical member 5 is supported by means of ball races and bearing balls on the bearing element 4 for rotary movements about an axis extending radially of the propeller shaft. The bearing 4, 5 thus acts as a thrust bearing for the load exerted on the blade by the centrifugal force. A liner 6 carrying a transverse hollow pivot pin 7 is screwed into the cylindrical member 5. A bearing element 10 is pivotally mounted on the pin 7 by means of ball bearings, and the blade root 8 is screwed into an internally threaded extension socket of the bearing element 10. The pivot axis of the bearing element 10 coincides with the axis of pin 7 and constitutes the transverse tilting axis referred to above in connection with Fig. 1. The blade is thus capable of two independent adjusting movements, viz. a tilting movement about the transverse axis without change of pitch, when the bearing element 10 pivots about pin 7 and the cylindrical member 5 remains stationary, and a rotary movement together with the bearing element 10 and the cylindrical member 5 about the radial axis of the bearing element 4, this rotary movement being caused by the air thrust in relation to torque resistance and centrifugal force, as described with reference to Fig. 1. The angular position of the transverse tilting axis with respect to the face of the blade can be manually adjusted when the aeroplane is at rest on the ground by turning the blade and its root 8 in the screw thread of the extension socket 9. The distance of the transverse axis from the axis of the propeller shaft can likewise be manually adjusted by screwing the socket 2, and with it the whole unit, into or out of the hub member 2.

In the modified embodiment, illustrated in Fig. 3, the propeller hub 1 and the socket 2 are constructed and arranged in a manner substantially similar to that shown in Fig. 2. In this case, however, the socket 2 has rigidly mounted therein two spherically curved centrally perforated bearing members 11 and 12 which cooperate with similarly shaped bearing members 13 and 14, respectively. The bearing members 13 and 14 are rigid with a stepped nut screwed onto an externally threaded extension 9 of the blade root 8. The blade root 8 is provided with a spherically curved bottom portion which rests on and cooperates with the top of the bearing member 11 and serves as an additional bearing element. The bearing members 11, 12 on the one hand and 8, 13 and 14 on the other hand are constructed to slide against one another and to allow the blade free movement in every direction in the manner of a ball joint. However, according to the invention, the blade may carry out, in addition to rotary movements about an axis radial of the propeller axis and coinciding with the cylinder axis of socket 2, tilting movements about only one transverse axis extending at right angles to said radial axis. In order to limit the movements of the blade root 8 in this manner, tongues 17 are provided on the convex face of the spherically curved bearing member 14, said tongues engaging transversely extending grooves in a spherically curved flange 16a of an annular member 16 without transmitting to the latter any part of the centrifugal load acting on the blade. An external screw thread on the annular member 16 engages an internal screw thread at the inner end of the socket 2 so as to permit easy rotation of the member 16a relative to socket 2 about the radial axis. Thus, the blade can carry out tilting movements only in the plane of the tongue and groove movement about a transverse axis indicated by the circle 10 and passing through the common centre of the imaginary concentric spheres according to which the various bearing members are curved, said transverse axis 10 being disposed at a predetermined angle with respect to the blade face and at a variable angle relative to the propeller axis. In Fig. 3, the blade is shown in a position, in which the transverse axis 10 extends at right angles to the propeller axis. The distance of the transverse axis 10 from the propeller axis may be manually adjusted by screwing the socket 2 into or out of the hub 1 and the predetermined angle between the transverse tilting axis 10 and the face of the propeller blade may be altered by turning the blade root extension 9 in the nut carrying the bearing member 13, 14.

In the embodiment of the invention illustrated in Fig. 4, the mounting for each propeller blade comprises a cylindrical socket 2 screwed into the propeller hub and secured in position by suitable locking means (not shown). The outer end of socket 2 is formed as a convex-concave hemispherical element 20 having its convex side facing outwardly. The outer convex face of the bearing element 20 cooperates with a concave spherically curved element 21 secured directly and rigidly to the blade root 23, and the inner concave face of the bearing element 20 coacts with a convex spherically curved bearing element 22 which is screwed on a bolt 24 mounted in the blade root 23 and passing with clearance through a central aperture provided in the top of the bearing element 20. The parts 21, 22, 23 and 24 are rigidly secured together to move as a single unit.

The bolt 24 projects inwardly beyond the bearing member 22, and its inner end portion is provided with teeth 25 engaging a correspondingly toothed portion of a ring member 26. The ring member 26 straddles, by means of a transverse groove 17a provided therein, a spherically curved rib 16b carried by an annular member 16 easily rotatable in the bottom of the socket 2. The bearing elements 20, 21 and 22 and the rib 16b are curved on concentric imaginary spheres so that the transverse tilting axis passes through the common centre of the spheres. The internally toothed ring member 26 is slidable axially of the bolt 24, and it is held in the illustrated position, in which its toothed portion engages the toothed portion of bolt 24 and its groove 17a is engaged by the rib 16b, by means of a spring 27. The rotary movement of the annular member 16 with respect to the socket 2 is limited by means of a stop screw passing transversely through the wall of the socket 2 near the bottom thereof and cooperating with two abutments 29 projecting downwardly from the member 16, only one of the abutments 29 being visible in the drawing. Thus, the rotary movement of the blade about the radial axis coinciding with the cylinder axis of socket 2 is confined to the maximum amount required for the pitch adjustment. One of the abutments 29 serves to stop the blade in the position of infinitely large pitch which it will assume under the action of the negative air thrust when the engine is shut off during flight thereby preventing the resistance of the air to the forward movement of the aircraft from exerting a torque on the propeller, while the other abutment 29 stops the blade in its position of smallest effective pitch.

The automatic pitch adjustment of the blade in an arrangement according to Fig. 4 takes place in the manner described with reference to Fig. 1, and the only difference in operation between this embodiment and those illustrated in Figs. 2 and 3 is due to the smaller distance of the transverse tilting axis from the propeller shaft.

For manual adjustment of the predetermined angle between the transverse axis and the working face of the blade, the stop screw 28 is removed, the annular member 16 screwed out of the socket 2, and the ring 26 which will slide axially off the teeth 25 is replaced thereon after having been turned to the desired extent so as to alter the angular position of the transverse groove 17a with respect to the bolt 24. The adjustment of the distance between the transverse axis and the propeller shaft is effected, as in the previously described embodiments, by screwing the socket 2 into or out of hub 1.

In the construction shown in Fig. 4, an auxiliary device serves to counteract the pitch decreasing tendency of the centrifugal couple which acts on each blade during rotation of the propeller and to modify the automatic pitch adjustment of the blade. The auxiliary device comprises two governors of identical construction arranged symmetrically on opposite sides of the blade, only one of said governors being shown in the drawing. Each governor comprises an angle lever 53 journalled in a bracket 56 carried by a flange 50 of a sleeve 51 surrounding the root of the blade 23 to swing in a plane including the centroid line of the blade and intersecting the mean chord of all the blade elements at a predetermined angle which, in the example shown, is 90°. The outwardly projecting arm of each angle lever 53 carries a mass 52 and is normally pressed towards the centroid line of the blade by means of a spring 54 which is supported on a second peripheral flange 55 and which acts on the other arm of the angle lever 53. When the propeller rotates, the centrifugal force urges the masses 52 away from the axis of rotation thereby adjusting the levers 53 against the force of springs 54 to positions in which the masses 52 are at a greater distance from the centroid line of the blade than in the rest position of the propeller. Owing to this arrangement, the masses 52 are capable of counteracting the pitch decreasing tendency of the centrifugal couple acting on the mass of the blade during rotation of the propeller by setting up a second pitch increasing centrifugal couple of a magnitude varying with the moment of inertia of the masses 52 about the centroid line of the blade in dependence upon the speed of rotation of the propeller. If the governors 50, 52, 53 and 54 are calculated to adjust the masses 52, at a predetermined normal propeller speed, to positions in which they produce a predetermined compensation of the pitch decreasing centrifugal couple, an overcompensation of this couple and a corresponding pitch increasing tendency is obtained at higher propeller speeds, while, at lower propeller speeds, the pitch decreasing couple is only partly balanced.

In the embodiment of the invention illustrated in Fig. 5, the socket 2 and the bearing elements 20 and 21 are similar to the corresponding parts in Fig. 4, but the outer concave spherically curved bearing element 21a forms the bottom of a blade root socket 30 adapted to tightly embrace and securely hold the root of a propeller blade. The inner convex spherically curved bearing element 22 is connected to the socket 30 by means of a hollow bolt 31, which extends through an aperture in the bottom 21a of the socket 30 and, with considerable clearance, through an aperture in the top of bearing element 20. The outer end of the bolt 31 which projects into the socket 30 is formed with a head 31a. The bottom of socket 30 and the head 31a are provided on their sides facing each other with cooperating sets of teeth 32 extending radially of the axis of bolt 31 and preventing angular displacement of the socket 30 relative to bolt 31 when the two sets of teeth 32 are in engagement with each other. The centrifugal thrust is transmitted to the bearing elements 22, 20 by means of a ball bearing 33 and a lock nut 34 screwed onto the inner end portion of the bolt 31 in order to secure the ball bearing 33 in place and to draw the head 31a against the bottom of the socket 30. The inner end portion of the hollow bolt 31 is provided with an internal screw thread 36 of very steep pitch which is engaged by a corresponding screw thread on the shank 17c of a tongue shaped guide member 17d. The tongue 17d is guided in a transverse slot 16' of a spherically curved disc 16c mounted by means of a nut 16d in the bottom of the cylindrical socket 2 to be freely rotatable therein about the axis of the socket 2 which extends radially of the propeller axis. A rod 37 is screwed into a threaded bore traversing the tongue 17d and its shank 17c and projects through the hollow bolt 31 axially thereof. The rod 37 is guided with a tight fit in suitable apertures provided in a transverse web 40 and in the head 31a of the bolt 31, and it has rigidly secured thereto a hydraulic piston 41 slidable in the hollow bolt 31. A spring 42 disposed between the web 40 and the piston 41 urges the latter outwardly. A flexible tubing serves to supply oil under pressure to a duct 44 provided in the rod 37 and, hence, to the space 31b between the piston 41 and the head 31a, and a pilot operated control (not shown) permits of increasing or reducing at choice the hydraulic pressure acting on the piston 41.

In the construction according to Fig. 5, the normal angle between the blade face and the transverse tilting axis is determined by the angular position of the tongue 17d relative to the face of the blade. This angle is set by unscrewing the nut 34 and displacing the bolt 31 outwardly until the teeth 32 on the head 31a and on the bottom of socket 30 are disengaged from one another, whereupon the socket 30 may be turned to the desired angular position relative to the bolt head 31a and to the tongue 17d. Finally the bolt 31 and socket 30 are locked in their selected relative angular positions by reengagement of the teeth 32 and tightening of the lock nut 34.

If an additional pitch adjustment is to be effected during flight, the hydraulic pressure acting on the piston 41 is adjusted to effect a displacement of the piston 41, rod 37, shank 17c and tongue 17d longitudinally of the bolt 31, such displacement causing a rotary movement of the shank 17c and tongue 17d relative to the bolt head 31a and socket 30 and also to the face of the blade mounted in the latter, owing to the steep pitch screw engagement between the shank 17c and the inner end portion of bolt 31 at 36.

If, for instance, an air speed is attained, which is beyond the range of the automatic adjustment, as for instance during a nose dive, the development of an excessive engine speed may be prevented by increasing the hydraulic pressure on the piston 41 to move the same inwardly against the action of the spring 42. In this manner, the tongue 17d and shank 17c are displaced axially of the bolt 31 and rotated to turn the transverse tilting axis relatively to the bolt 31, and, hence, to the face of the blade, thereby increasing the pitch to the desired extent.

On the other hand, the hydraulic pressure on piston 41 may be reduced to decrease the blade pitch, for instance in order to provide a suitable starting torque. A specific application of the hydraulic control for reduction of the blade pitch is for the purpose of restarting, during flight, without use of a starter, an engine which has been shut off, when the propeller blades have been adjusted automatically to an infinitely large pitch. If, in this case, the hydraulic pressure on piston 41 is altered to effect a rotation of tongue 17d whereby the blade pitch is reduced, the resistance of the air to the forward movement of the aircraft will exert a torque on the propeller sufficient to restart the engine.

Fig. 6 shows a modified construction of the hollow bolt 31a for automatic variation of the automatic pitch adjustment. In this case, the rod 37, which is rigidly secured to the shank 17c of tongue 17d, terminates just outside of the transverse guide web 40 and carries on its outer end a centrifugal weight 38 slidable in the hollow bolt 31 and loaded by a spring 39 disposed between the web 40 and the end of shank 17c mounted in the bolt 31. The outward stroke of the centrifugal weight 38 is limited by a cap 31c screwed into the head 31a of the bolt 31. The spring 39 acting on the shank 17c of tongue 17d may be made so strong that throughout the predetermined propeller speed range, within which the blade pitch is automatically adjusted to the optimum pitch position by the movement of the blade about the radial and transverse axes, the centrifugal weight 38 is held in contact with the web 40 and the tongue 17d is retained in a fixed angular position relative to the bolt 31 and to the face of the blade. If, in this case, the propeller speed exceeds a certain value, due, for instance, to an air speed beyond the control range of the bearing arrangement, the centrifugal weight 38 will gradually move outwardly against the action of spring 39, thereby axially displacing and turning shank 17c and tongue 17d and with them the slotted disc member 16c relatively to the bolt 31. This adjustment causes the transverse tilting axis, which extends always at right angles to the slot 16' in the disc 16c, to change its angular position with respect to the face of the blade, the latter being rigid with bolt 31, and, as a result, the pitch of the blade will be increased as the blade tends to retain its inclination under the combined influence of centrifugal force, torque resisting force and air thrust.

On the other hand, the spring 39 may be made so weak that, throughout the propeller speed range within which the automatic pitch adjustment of the blade is satisfactorily accomplished by the rotary and tilting movements of the blade about the radial and transverse axes, respectively, the centrifugal weight will always be retained at the outer limit of its stroke where it abuts against the cap 31c in the head 31a and will only move inwardly against the action of the centrifugal force if the engine speed falls below the normal range. The centrifugal weight 38 moving inwardly will, then, impart to the tongue 17d, and, thence, to the transverse axis a turning movement which causes a sufficient reduction in the pitch of the blade to raise the engine speed to normal, or, at least, to prevent the engine from slowing down too far.

If desired, the spring 39 may also be calculated to produce an action which varies in different stages of the adjustment range of the spring, or which, in terms of graphic representation, is not linear; this may be accomplished by designing the spring with cone shaped turns or turns of different pitch, or by providing several cooperating springs. If the spring characteristics are not linear, blade pitch and propeller speed values may be predetermined for any desired number of flight conditions.

It will be understood that, while reference has been made to one blade only in the preceding description of specific embodiments of the invention, the same principles will apply to any number of blades with which a propeller may be provided, a partial indication of a second blade being contained in Figs. 2, 3 and 5.

I claim:

1. A variable pitch propeller for aircraft, comprising a hub, a plurality of blades, bearing means for each blade including a thrust bearing mounted on said hub and supporting the blade for rotary movements about an axis fixed with respect to and radial of said hub, and a pivot bearing cooperating with said thrust bearing and permitting movements of the blade without change of pitch about only one transverse axis extending at substantially right angles to the centroid line of the blade and at substantially right angles to said radial axis and being spaced a predetermined distance from the axis of the hub, said pivot bearing being freely turnable with respect to the hub about said radial axis, said blades being constructed and arranged to cause rotary movements of said pivot bearing about said radial axis under the influence of aerodynamic and centrifugal forces, and connecting means between each pivot bearing and blade determining the angle of the blade face relative to the transverse tilting axis of the blade.

2. A variable pitch propeller, as claimed in claim 1, in which said connecting means are adapted to retain each blade normally at a selected fixed angle relative to its transverse tilting axis.

3. A variable pitch propeller, as claimed in claim 1, comprising means to change the angle between each blade and its transverse tilting axis during flight.

4. A variable pitch propeller, as claimed in claim 1, comprising governor means including a centrifugal element and a spring to automatically change the angle between each blade and its transverse tilting axis during flight in dependence upon the number of revolutions of the propeller.

5. A variable pitch propeller, as claimed in claim 1, comprising means including a hydraulic piston and a pilot controlled supply of pressure fluid to change the angle between each blade and its transverse tilting axis at will during flight.

6. A variable pitch propeller for aircraft, comprising a hub, a plurality of blades, and, for each blade, a bearing including a part-spherical bearing element mounted on said hub with its axis extending radially of the latter, a second part-spherical bearing element concentric with and engaging said first bearing element for rotary movements about said radial axis and, independently of said rotary movements for tilting movements with respect to said radial axis, means connecting said second bearing element with the blade root and including a guide member extending in a plane containing said radial axis, and a guide element mounted on said first bearing element for rotation about said radial axis and for cooperation with said guide member to limit said second bearing element and blade to tilting movements about only one transverse axis extending at right angles to said radial axis and at a predetermined distance from the axis of the hub, said blades being constructed and arranged to cause rotation of said guide element relative to said first bearing element under the influence of aerodynamic and centrifugal forces.

7. A variable pitch propeller, as claimed in claim 6, in which said connecting means between said second bearing and blade root includes two serrated members releasably engaging one another in any desired angular position.

8. A variable pitch propeller, as claimed in claim 6, in which said guide member and guide element include a tongue and groove arrangement.

9. A variable pitch propeller, as claimed in claim 6, in which said connecting means between said second bearing and blade root includes a bolt extending with considerable clearance through an axial opening of said first bearing element, said guide member being carried by the inner end of said bolt.

10. A variable pitch propeller, as claimed in claim 6, in which said connecting means between said second bearing element and blade includes a hollow bolt extending with considerable clearance through an axial opening of said first bearing element, a steep pitch internal screw thread on the inner end of said bolt, an externally screw threaded projection on said guide member fitted into the internal screw thread of said bolt, and means for causing an axial displacement of said guide member with respect to said bolt to effect relative rotation.

11. A variable pitch propeller, as claimed in claim 6, in which said connecting means between said second bearing element and blade includes a hollow bolt extending with considerable clearance through an axial opening in said first bearing element, a steep pitch internal screw thread on the inner end of said bolt, an externally screw threaded projection on said guide member fitted into the internal screw thread of said bolt, a centrifugal weight slidable in said hollow bolt and connected with said guide member, and a spring urging said centrifugal weight towards the inner end of said bolt.

12. A variable pitch propeller, as claimed in claim 6, in which said connecting means between said second bearing element and blade includes a hollow bolt extending with considerable clearance through an axial opening in said first bearing element, a steep pitch internal screw thread on the inner end of said bolt, an externally screw threaded projection on said guide member fitted into the internal screw thread of said bolt, a hydraulic spring pressed piston slidable in said bolt and connected with said guide member, and means to supply a pressure liquid to the interior of said bolt for axial displacement of said piston and relative rotation between said guide member and bolt.

13. A variable pitch propeller, as claimed in claim 1, in which said thrust bearing is mounted on said hub for radial adjustment relative thereto, to permit alteration of the distance between the tilting axis of the blade and the axis of the hub.

14. In a variable pitch propeller having a hub and a plurality of blades, the arrangement, on each blade, of at least one additional mass, means to hingedly support said mass wholly on said blade for rotary movements therewith as the blade pitch changes and for swinging movements towards and away from the centroid line of the latter blade in a plane intersecting the mean chord of all the blade elements at a predetermined angle to permit said mass of counteracting the pitch decreasing tendency of the centrifugal couple which acts on the blade during rotation of the propeller, and resilient means holding said mass normally at a predetermined distance from said centroid line, whereby the moment of inertia of said mass about said centroid line varies in dependence upon the speed of rotation of the propeller.

15. In a variable pitch propeller having a hub and a plurality of blades, the combination, for each blade, of two additional masses, means to hinge said masses symmetrically to opposite sides of said blade for swinging movements towards and away from the centroid line of the latter in a common plane intersecting the mean chord of all the blade elements at substantially right angles, and resilient means holding said masses normally at a predetermined distance from said centroid line whereby the pitch decreasing tendency of the centrifugal couple, which acts on each blade during rotation of the propeller, is counteracted by said masses to an extent varying in dependence upon the speed of rotation of the propeller.

HANS REISSNER.
MANFRED CHRISTIAN.